United States Patent
Kozawa (10) Patent No.: US 11,183,963 B2
(45) Date of Patent: Nov. 23, 2021

(54) ABNORMALITY DETECTION DEVICE

(71) Applicant: DENSO CORPORATION, Kariya (JP)

(72) Inventor: Takaharu Kozawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/840,725

(22) Filed: Apr. 6, 2020

(65) Prior Publication Data

US 2020/0321902 A1    Oct. 8, 2020

(30) Foreign Application Priority Data

Apr. 8, 2019 (JP) .............................. JP2019-073466

(51) Int. Cl.
| | |
|---|---|
| *H02P 1/32* | (2006.01) |
| *H02P 3/20* | (2006.01) |
| *H02P 7/06* | (2006.01) |
| *H02P 29/028* | (2016.01) |
| *B62D 5/04* | (2006.01) |
| *H02P 27/06* | (2006.01) |
| *H02P 25/22* | (2006.01) |

(52) U.S. Cl.
CPC .......... *H02P 29/028* (2013.01); *B62D 5/0463* (2013.01); *H02P 25/22* (2013.01); *H02P 27/06* (2013.01)

(58) Field of Classification Search
CPC ......... H02P 29/028; H02P 25/22; H02P 27/06

USPC ........................................................ 318/496
See application file for complete search history.

(56) References Cited

U.S. PATENT DOCUMENTS

| | | | |
|---|---|---|---|
| 8,941,337 B2* | 1/2015 | Uryu ....................... | H02P 27/06 |
| | | | 318/9 |
| 2011/0290580 A1 | 12/2011 | Mukai et al. | |
| 2017/0237377 A1* | 8/2017 | Furukawa ............... | H02P 29/00 |
| | | | 318/564 |

FOREIGN PATENT DOCUMENTS

JP         5093698 B2     12/2012

* cited by examiner

*Primary Examiner* — Erick D Glass
(74) *Attorney, Agent, or Firm* — Maschoff Brennan

(57) ABSTRACT

Driver circuits are provided in correspondence to switching elements of an inverter to output gate signals to the switching elements and built in an IC package in an abnormality detection device (ECU). Motor relays are provided in motor current paths between inter-arm connection points and multi-phase motor windings. Pull-up resistors connect a power supply line and the inter-arm connection points. Pull-down resistors connect the inter-arm connection points and the ground. A checking unit acquires a voltage corresponding to a voltage of each inter-arm connection point as a terminal voltage and checks a short-circuit failure or an open-circuit failure of each motor relay or a disconnection failure of each winding based on the terminal voltage. The pull-up resistors and the pull-down resistors are provided within the IC package in which the driver circuits are built.

5 Claims, 7 Drawing Sheets

FIG. 7 COMPARISON EXAMPLE

ABNORMALITY DETECTION DEVICE

CROSS REFERENCE TO RELATED APPLICATION

The present application claims the benefit of priority from Japanese Patent Application No. 2019-073466 filed on Apr. 8, 2019. The entire disclosures of the above application are incorporated herein by reference.

FIELD

The present disclosure relates to an abnormality detection device.

BACKGROUND

Conventionally, an abnormality detection device detects a short-circuit failure and an open-circuit failure of a relay and a disconnection failure of a motor winding based on a voltage at a connection point of switching elements of an upper and lower arms of each phase of an inverter in an initial checking process of a circuit that supplies power to a multi-phase AC motor.

For example, in one conventional electric motor driving device, a pull-up resistor is provided to connect a power supply line of an inverter and a motor winding. This driving device detects a short-circuit failure and an open-circuit failure of a power supply relay by detecting a divided voltage of a pull-down resistor connected to switching elements of upper and lower arms of each phase of an inverter while operating the power supply relay to turn on and off.

SUMMARY

According to the present disclosure, an abnormality detection device comprises an inverter, motor relays, pull-up resistors, pull-down resistors, a checking unit and driver circuits. The inverter is configured in a bridge form of multiple phases between a power supply line and a ground line connected to a DC power supply and has a high-side switching element and a low-side switching element as bridge arms connected in series in each phase to convert a power of the DC power supply and supply a converted power to each phase winding of an AC motor of multiple phases. Each motor relay is provided in a motor current path between an inter-arm connection point between the high-side switching element and the low-side switching element of each phase and the phase winding of each phase to conduct and cut off the motor current path. Each pull-up resistor connects the power supply line and the inter-arm connection point of each phase. Each pull-down resistor connects the inter-arm connection point of each phase and the ground. A checking unit is configured to acquire a voltage corresponding to a voltage of the inter-arm connection point of each phase as a terminal voltage and check a short-circuit failure or an open-circuit failure of the motor relay or a disconnection failure of the phase winding of each phase based on the terminal voltage. The driver circuits are packaged within a driver circuit IC and provided to output gate signals to the high-side switching element and the low-side switching element of the inverter, respectively

DETAILED DESCRIPTION OF THE EMBODIMENT

Several embodiments of an abnormality detection device will be described below with reference to the accompanying drawings. In the following embodiments, substantially same structural parts are designated with the same reference numerals thereby to simplify the description. The abnormality detection device of the present embodiment is used for an initial checking of a device that controls driving of a steering assist motor in an electric power steering apparatus of a vehicle, and configured to detect an abnormality of a short-circuit failure and an open-circuit failure of a motor relay, or a disconnection failure of each phase winding.

[Configuration of Electric Power Steering Apparatus]

Figure 1:
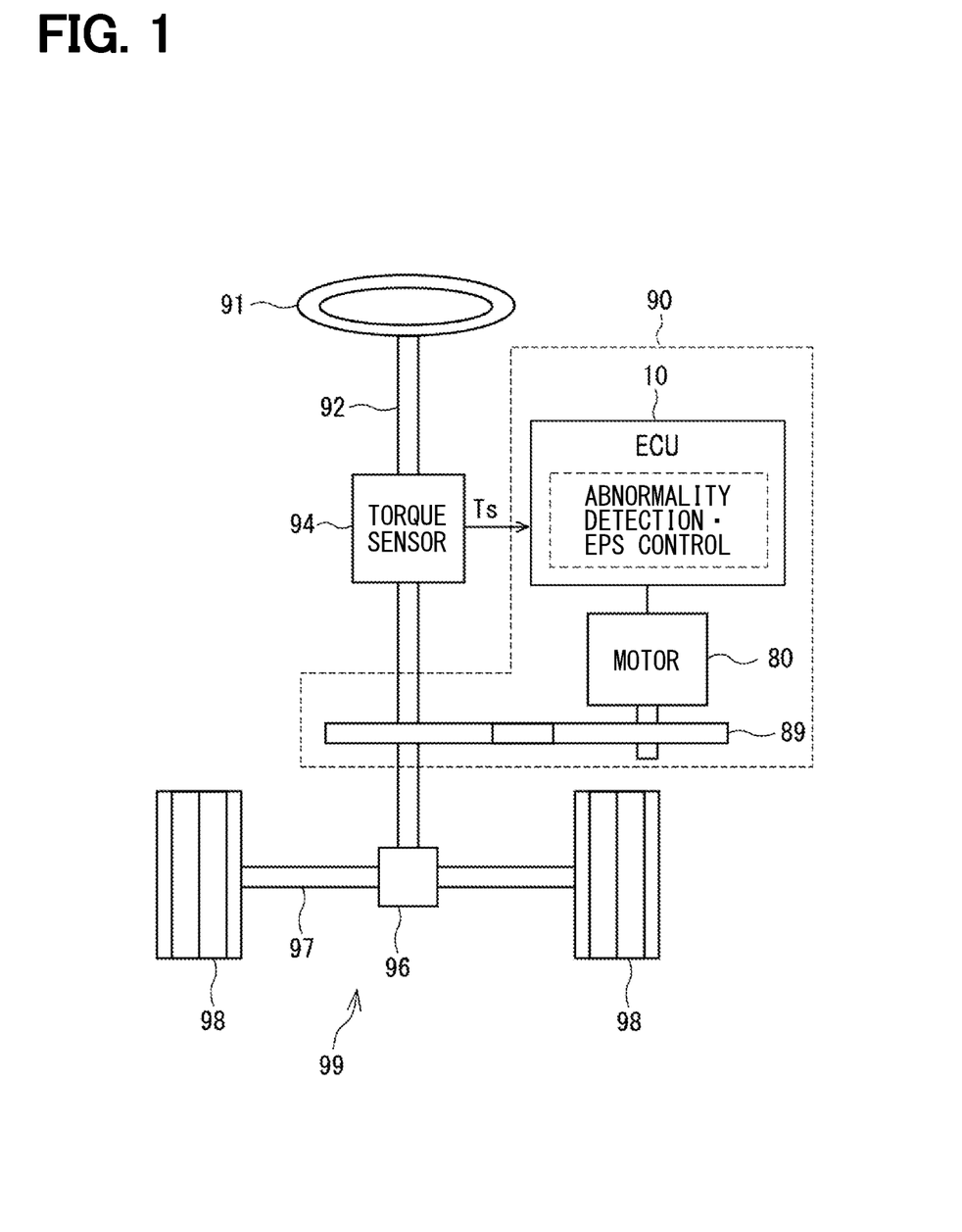
FIG. 1 is a schematic configuration diagram of an electric power steering apparatus to which an abnormality detection device of each embodiment is applied.

FIG. 1 shows an overall configuration of a steering system 99 including an electric power steering apparatus 90 for a vehicle. The electric power steering apparatus 90 illustrated in FIG. 1 is of a column assist type, but it may be of a rack assist type. The steering system 99 includes a steering wheel 91, a steering shaft 92, a steering torque sensor 94, a pinion gear 96, a rack shaft 97, a pair of road wheels 98, the electric power steering apparatus 90 and the like.

The steering shaft 92 is coupled to the steering wheel 91. The pinion gear 96 provided at an axil end of the steering shaft 92 engages with the rack shaft 97. The pair of road wheels 98 is provided at both ends of the rack shaft 97 via, for example, tie rods. When a driver rotates the steering wheel 91, the steering shaft 92 coupled to the steering wheel 91 rotates. A rotational motion of the steering shaft 92 is converted into a linear motion of the rack shaft 97 by the pinion gear 96 and the pair of road wheels 98 is steered to an angle corresponding to a displacement amount of the rack shaft 97. The steering torque sensor 94 is provided at an intermediate portion of the steering shaft 92 to detect a steering torque applied by the driver.

The electric power steering apparatus 90 includes an ECU (electronic control unit) 10, a motor 80, a reduction gear 89, and the like. The motor 80 is a multi-phase AC motor, for example, a three-phase AC brushless motor. The ECU 10 of the present embodiment has both a function as a motor control device and a function as an abnormality detection device.

The ECU 10 functioning as the motor control device controls driving of the motor 80 so that the motor 80 generates a desired assist torque based on a steering torque Ts detected by the steering torque sensor 94. Specifically, as will be described later with reference to FIG. 2, the ECU 10 acquires detection values of a motor current and an electrical angle, and drives an inverter by current feedback control. The inverter converts a power of a DC power supply into three-phase AC power and supplies it to each phase winding of the motor. Since general motor control is known well, detailed description thereof is not made. An assist torque generated by the motor 80 is transmitted to the steering shaft 92 via the reduction gear 94.

On the other hand, the ECU 10 functioning as an abnormality detection device performs an initial checking before starting driving of the motor when a vehicle switch is turned on. It should be noted that abnormality detection of a power supply relay and switching elements of the inverter is also known well. Hence, in the present embodiment, detection of abnormality of a short-circuit failure or an open-circuit failure of a motor relay, or a disconnection failure of each phase winding will be described in detail.

[Configuration of ECU (Abnormality Detection Device)]

Figure 2:
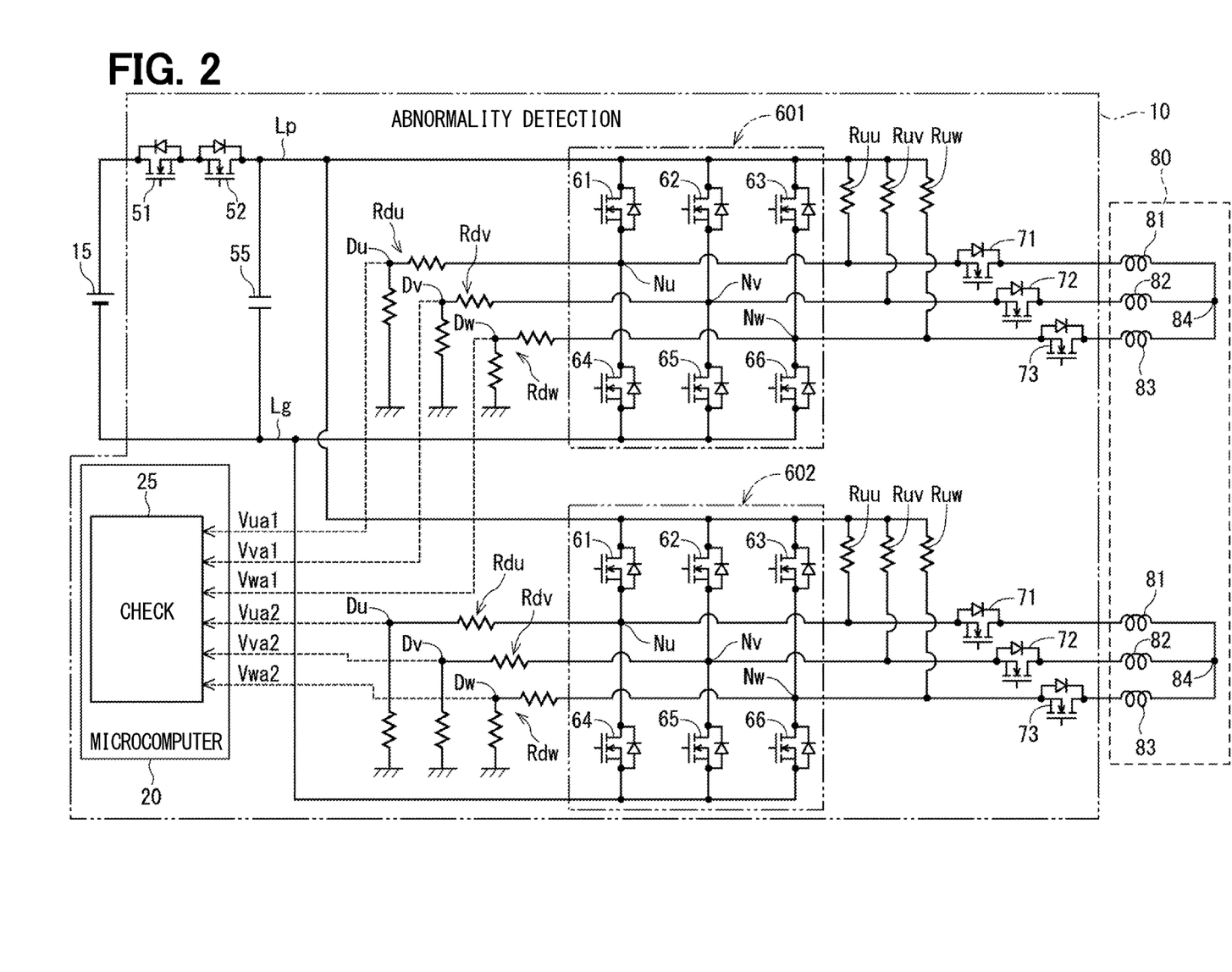
FIG. 2 is a circuit configuration diagram of an abnormality detection device for two systems.

As shown in FIG. 2, the ECU 10 of the present embodiment is assumed to be used in a redundant configuration of two systems (first system and second system). In FIG. 2, only inverters 601 and 602 of the first and second systems as well as phase terminal voltages Vua1, Vva1, Vwa1, Vua2, Vva2 and Vwa2 of each system are distinguished by "1" and "2" attached to ends of reference numerals or symbols. Other components are substantially the same in configuration and operation between the two systems and hence indicated by the same reference numerals without distinguishing from each other.

The ECU 10 is applied to the motor 80 having two sets of three-phase windings 82 and 83. A U-phase winding 81, a V-phase winding 82 and a W-phase winding 83 of the motor 80 are Y-connected at a neutral point 84. The configuration of the Y connection is a premise for performing a failure checking process shown in FIG. 5 and FIG. 6. However, in case that a failure checking process is executed by other logic, the motor may be a Δ-connected winding type.

The ECU 10 includes a power supply relay 51, a reverse connection relay 52 and a smoothing capacitor 55, which are in common to the two systems. The ECU 10 further includes, for each system, inverters 601, 602, motor relays 71, 72, 73, pull-up resistors Ruu, Ruv, Ruw, and pull-down resistors Rdu, Rdv, Rdw, etc. In addition, the ECU 10 includes a checking unit 25 inside a microcomputer 20.

The inverters 601 and 602 are connected to a positive polarity side (high potential side) of a battery 15, which is a DC power supply, via a power supply line Lp, and are connected to a negative polarity side (low potential side) of the battery 15 via a ground line Lg. Each inverter 601, 602 is configured by connecting high potential side switching elements 61, 62 and 63 of a U-phase, a V-phase and a W-phase and low potential side switching elements 64, 65 and 66 of the U-phase, the V-phase and the W-phase in a bridge circuit form so that the electric power is converted and supplied to each phase winding 81, 82 and 83 of the motor 80. The switching elements 61, 62 and 63 form upper arms and the switching elements 64, 65 and 66 form lower arms. The switching elements in the upper arm and the lower arm in each phase are connected in series.

In the present embodiment, MOSFETs are used as the switching elements 61 to 66 of the inverters 601 and 602. In each of the switching elements 61 to 66, a free-wheeling diode that allows a current from the low potential side to the high potential side is configured as a parasitic diode inside the switching element. Hereinafter, the switching elements of the upper arms are referred to as high-side FETs 61, 62, 63, and the switching elements of the lower arms are referred to as low-side FETs 64, 65, 66. A connection point between the high-side FET 61, 62, 63 and the low-side FET 64, 65, 66 of each phase is referred to as an inter-arm connection point Nu, Nv, Nw, respectively. The inter-arm connection points Nu, Nv, Nw are connected to the phase windings 81, 82, 83, respectively.

The power supply relay 51 and the reverse connection relay 52 are connected in series in the middle of the power supply line Lp between the battery 15 and the inverters 601 and 602. The reverse connection relay 52 is a reverse connection protection relay or a reverse connection prevention relay. In the present embodiment, the power supply relay 51 and the reverse connection relay 52 are also MOSFETs. The power supply relay 51 has a free-wheeling diode that allows a current to flow toward the battery 15 side. The reverse connection relay 52 has a free-wheeling diode that allows a current to flow toward the inverters 601 and 602. The smoothing capacitor 55 smoothens an input voltage to inverters 601 and 602.

The motor relays 71, 72 and 73 are provided in motor current paths between the inter-arm connection points Nu, Nv and Nw of each phase and the phase windings 81, 82 and 83, respectively, to be able to interrupt the motor current paths. In the present embodiment, the motor relays 71, 72 and 73 are also MOSFETs, and have free-wheeling diodes that allow currents to flow from the inter-arm connection points Nu, Nv and Nw to the phase windings 81, 82 and 83, respectively. When an excessive counter-electromotive force voltage is generated in the motor 80, the motor relays 71, 72 and 73 are turned off to thereby prevent an overvoltage from being applied to the high-side and low-side FETs 61 to 66 of the inverters 601, 602.

Figure 3:
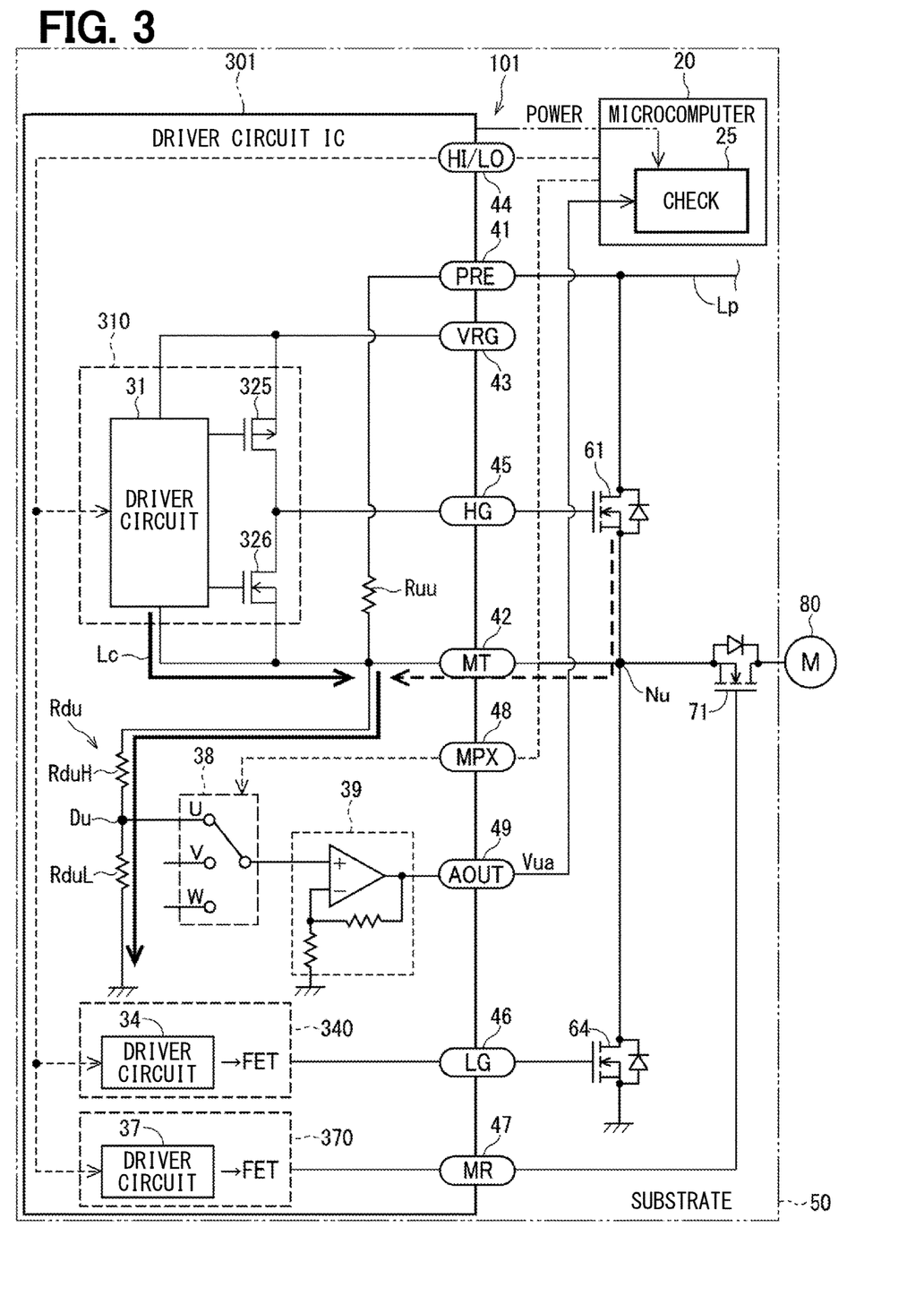
FIG. 3 is a circuit configuration diagram relating to a voltage monitor for one phase of the abnormality detection device according to the first embodiment.

Pull-up resistors Ruu, Ruv and Ruw are provided to connect the power supply line Lp and the inter-arm connection points Nu, Nv and Nw, respectively. Pull-down resistors Rdu, Rdv and Rdw are provided to connect the inter-arm connection points Nu, Nv and Nw and the ground, respectively. Hereinafter, the three pull-up resistors and the three pull-down resistors are simply referred to a pull-up resistor Ru and a pull-down resistor Rd in a comprehensive manner, respectively, in case that the phase is not specified. Each pull-down resistor Rdu, Rdv, Rdw has two voltage dividing resistors connected in series. In FIG. 3 and the like, regarding the U-phase pull-down resistor Rdu, the voltage dividing resistor at the inter-arm connection point Nu is indicated as RduH, and the voltage dividing resistor on the ground side is indicated as RduL.

Voltages at voltage dividing points Du, Dv and Dw, which are connection points of the two voltage dividing resistors, are monitored as voltages corresponding to the voltages at the inter-arm connection points Nu, Nv and Nw, respectively. That is, the voltages of the voltage dividing points Du, Dv and Dw of the first system is acquired as terminal voltages Vua1, Vva1 and Vwa1, respectively, and the voltages of the voltage dividing points Du, Dv and Dw of the second system is acquired as terminal voltages Vua2, Vva2 and Vwa2, respectively, by the checking unit 25. Although FIG. 3 and the like show a configuration in which the voltage acquired by amplifying the voltage at the voltage dividing point Du is acquired as the terminal voltage Vua, no amplifier circuit is shown in FIG. 2.

The checking unit 25 of the microcomputer 20 checks, based on the acquired terminal voltages Vua1, Vva1, Vwa1, Vua2, Vva2 and Vwa2, whether the motor relays 71, 72 and 73 of each system have the short-circuit failure or the open-circuit failure, or whether any one of the phase windings 81, 82 and 83 has the disconnection failure. The terminal voltage is indicated as the terminal voltage Va in a comprehensive manner in case that the phase of the terminal voltage is not specified.

As described above, the ECU 10 in the example of FIG. 2 has one pull-up resistor Ru and one pull-down resistor Rd, which includes two series-connected voltage dividing resistors, as the voltage monitoring resistors per phase, resulting in a total of 18 resistors for the two systems of three phases. Further, the checking unit 25 has channels to which six types of terminal voltages Vua1, Vva1, Vwa1, Vua2, Vva2 and Vwa2 are input. Thus, an A/D (analog/digital) conversion circuit is required. That is, the number of voltage monitoring resistors and terminals in an ECU for the redundant two systems increases as compared with an ECU for one system, resulting in a large-sized ECU for the two systems. However, since it is desired to further reduce the mounting size even in an ECU for the single system, the present embodiment may be applied to the ECU for the single system.

Figure 7:
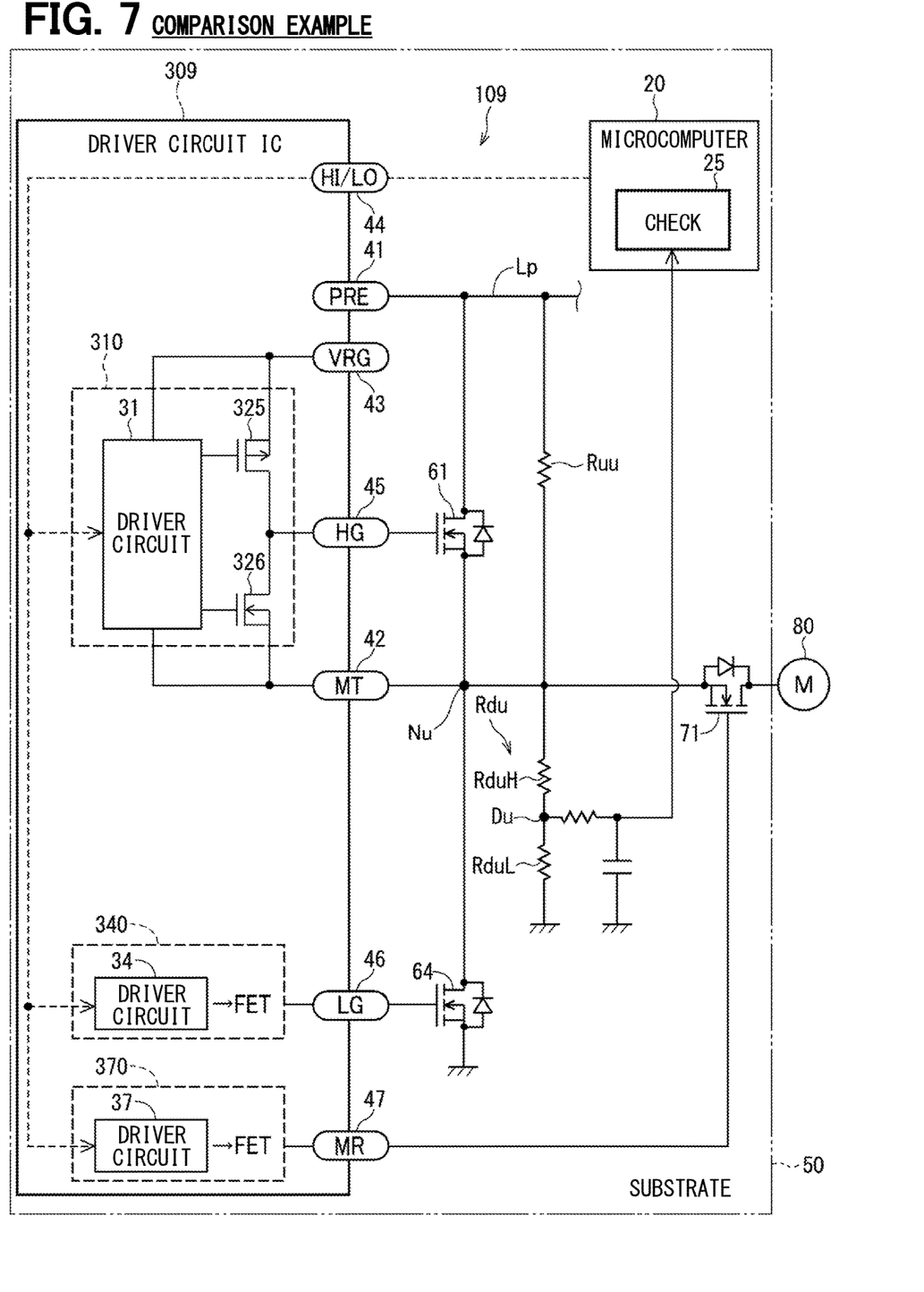
FIG. 7 is a circuit configuration diagram relating to a voltage monitor for one phase of an abnormality detection device of a comparison example.

Next, the mounting configuration of the pull-up resistors Ru, pull-down resistors Rd, monitor terminals and the like for voltage monitoring will be described. First, with reference to FIG. 7, the mounting configuration of an ECU 109 of a comparison example will be described. FIG. 7 shows a configuration relating to a voltage monitor for only one phase, with the U-phase as a representative example. Only the U-phase high-side FET 61 and the U-phase low-side FET 64 are shown as the switching elements of the inverter, and only the U-phase motor relay 71 is shown as the motor relay.

In FIG. 7, electronic components other than the motor 80 are mounted on a circuit substrate 50. On the circuit substrate 50, the microcomputer 20 and the driver circuit IC 309 are mounted as circuit chips, and other elements such as FETs and resistors are mounted in a manner externally provided outside the ICs. The driver circuit IC 309 is an ASIC in which a circuit having multiple functions for a specific application is built in an IC package. One driver circuit IC 309 may be provided in common for the two systems, or two driver circuit ICs may be provided for the two systems, respectively.

The driver circuit IC 309 includes multiple driver circuits 31 and 34 that are provided corresponding to at least the high-side FET 61 and the low-side FET 64 of the inverter to output a gate signal to each FET. Further, the driver circuit 37 is built in to output a gate signal to the motor relay 71. The motor relays 71, 72 and 73 of the three phases may be simultaneously turned on and off by a signal from a common driver circuit. Further, driver circuits for the power supply relay 51 and the reverse connection relay 52 may be built in the driver circuit IC 309. However, since operations of the power supply relay 51 and the reverse connection relay 52 are not described in the present embodiment, such relays are not shown in FIG. 7.

The driver circuit IC 309 is provided with multiple terminals 41 to 47. A pre-charge (PRE) terminal 41 is connected to the power supply line Lp. A motor (MT) terminal 42 is connected to the inter-arm connection point Nu, and is further connected to the motor 80 via the motor relay 71. The motor terminal 42 is connected to the driver circuit 31. A boost (VRG) terminal 43 is supplied with a reference voltage of the driver circuits 31, 34 and 37.

Although a HI/LO (high/low) terminal 44 to which a command signal to each driver circuit is input is actually provided individually, such terminals are collectively shown in FIG. 7 for convenience. The driver circuits 31, 34 and 37 output gate signals to a high-side gate (HG) terminal 45, a low-side gate (LG) terminal 46, and the motor relay (MR) terminal 47, respectively. Other terminals that are not related to the embodiments are not described for simplicity of description.

In the driver circuit 31 corresponding to the high-side FET 61, an output terminal of the driver circuit 31 is connected to the gates of a P-channel FET 325 for ON-driving and an N-channel FET 326 for OFF-driving. A source of the ON-driving FET 325 is connected to the boost terminal 43, and a source of the OFF-driving FET 326 is connected to the motor terminal 42. Drains of the ON-driving FET 325 and the OFF-driving FET 326 are connected to the high-side gate terminal 45. The driver circuit 31 operates the FETs 325 and 326 according to command signals input from the microcomputer 20 via the HI/LO terminal 44, thereby outputting the gate signal to the high-side FET 61 via the high-side gate terminal 45.

Here, a circuit unit including the driver circuit 31 and the FETs 325 and 326 is represented as a driver circuit set 310. Driver circuit sets 340 and 370 are shown in a simplified manner by not showing FETs for the driver circuit 34 and the driver circuit 37, which correspond to the low-side FET 64 and the motor relay 71, respectively, and not showing connections to the boost terminals 43. The driver circuit 34 operates the FETs in response to a command signal from the microcomputer 20 and outputs a gate signal to the low-side FET 64 via the low gate terminal 46. The driver circuit 37 operates the FETs in accordance with a command signal from the microcomputer 20 and outputs a gate signal to the motor relay 71 via the motor relay terminal 47.

Next, elements mounted on the circuit substrate 50 outside the microcomputer 20 and the driver circuit IC 309 will be described. Hereinafter, "outside IC" means on the circuit substrate 50 outside the microcomputer 20 and the driver circuit IC. "The reference numeral of the driver circuit IC is 309 in the comparison example. The driver circuit ICs are indicated by reference numerals 301 and 302 in the first and second embodiments shown in FIG. 3 and FIG. 4, respectively. The high-side FET 61, the low-side FET 64 and the motor relay 71, which are driven by the driver circuits 31, 34 and 37, respectively, are mounted outside the IC.

In addition, in the comparison example of FIG. 7, the pull-up resistor Ruu and the pull-down resistor Rdu, which is formed of the two voltage dividing resistors RduH and RduL, are all mounted outside the IC, and the voltage at the voltage dividing point Du is acquired by the checking unit 25. That is, since the resistors for voltage monitoring, three resistors per phase and a total of 18 resistors in the three-phase two systems are mounted outside the IC, the mounting area on the circuit substrate 50 need be increased. In contrast to this comparison example, the ECU of the present embodiment effectively suppresses an increase in a mounting area required for resistors and the like provided for voltage monitoring.

First Embodiment

The ECU 101 of the first embodiment will be described below with reference to FIG. 3. FIG. 3 shows a configuration related to a voltage monitor for one phase, with the U-phase as a representative example in the similar manner as the comparison example shown in FIG. 7. In the first embodiment, the pull-up resistor Ruu and the pull-down resistor Rdu formed of the two voltage dividing resistors RduH and RduL are provided within the driver circuit IC301. The pull-up resistor Ruu is connected between the pre-charge terminal 41 and the motor terminal 42. The two voltage dividing resistors RduH and RduL forming the pull-down resistor Rdu, which is connected in series to the pull-up resistor Ruu, are connected in series between the motor terminal 42 and the ground.

The voltage dividing point Du is connected to a monitor (AOUT) terminal 49 through a multiplexer 38 and an amplifier circuit 39. The multiplexer 38 is provided between the pull-down resistors Rdu, Rdv, Rdw of each phase and the monitor terminal 49. The multiplexer 38 selects the voltage at the voltage dividing point Du, Dv, Dw of any phase based on a selection signal input from the microcomputer 20 via a multiplexer (MPX) terminal 48, and outputs the selected voltage to the amplifier circuit 39 on the monitor terminal 49 side. Although the input of the multiplexer 38 is shown in three phases U, V, W of one system, six phases of two systems may be input.

The amplifier circuit 39 amplifies the voltage selected by the multiplexer 38 and outputs an amplified voltage to the monitor terminal 49. The monitor terminal 49 outputs the amplified voltage developed at the voltage dividing points Du, Dv, Dw to the checking unit 25 as the terminal voltage Va. Here, the amplified voltages at the voltage dividing points Du, Dv and Dw correspond to the voltages that correlate with the voltages at the inter-arm connection points Nu, Nv and Nw, respectively.

As described above, the ECU 101 of the first embodiment is provided with the pull-up resistor Ru and the pull-down resistor Rd in the driver circuit IC 301, so that an increase in the mounting area of the circuit substrate 50 is suppressed as compared with the ECU 109 of the comparison example. Further, by providing the multiplexer 38, the number of amplifier circuits 39 and the monitor terminals 49 and the number of communication lines and A/D inputs to the microcomputer 20 can be decreased to one. Therefore, the increase in the mounting area of the circuit substrate 50 is further suppressed, and the entire ECU 101 can be downsized by downsizing the microcomputer 20. In particular, in an electric power steering apparatus in which the mounting space is severely limited, it is effective to reduce the size of the ECU 101.

It is noted that, in case of mounting of the pull-up resistor Ru and the pull-down resistor Rd within the driver circuit IC301, it is likely that the driver circuit IC301 generates more heat because of current flow through the resistors Ru and Rd. Therefore, if the resistance values of the resistors Ru and Rd are set large in order to reduce the current, floating of a voltage increases due to a leak current Lc, which flows from the driver circuit 31 to the pull-down resistor Rd as shown by a thick solid line arrows in FIG. 3. This floating of the voltage causes an error.

Figure 5:
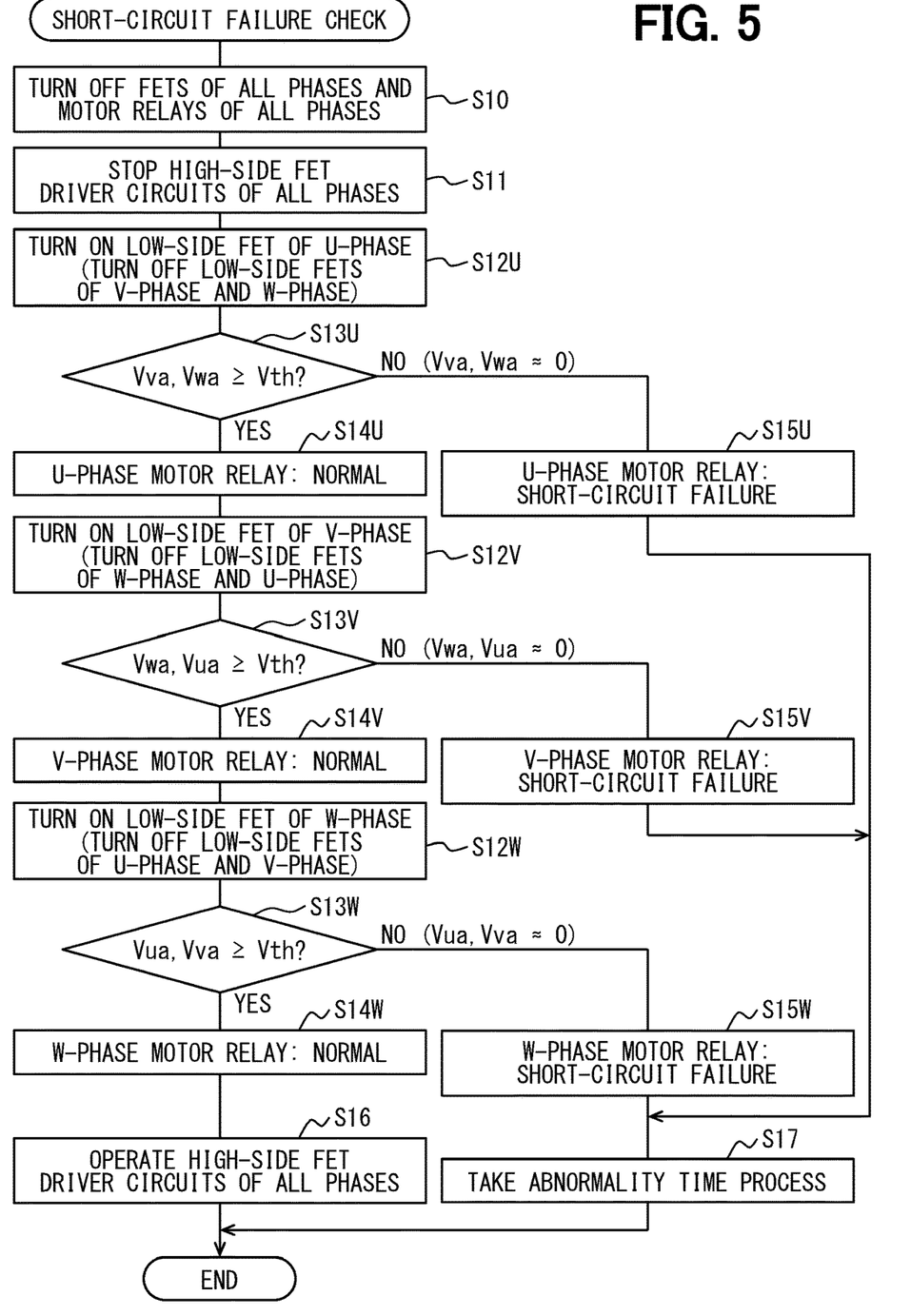
FIG. 5 is a flowchart of a short-circuit failure checking process.
Figure 6:
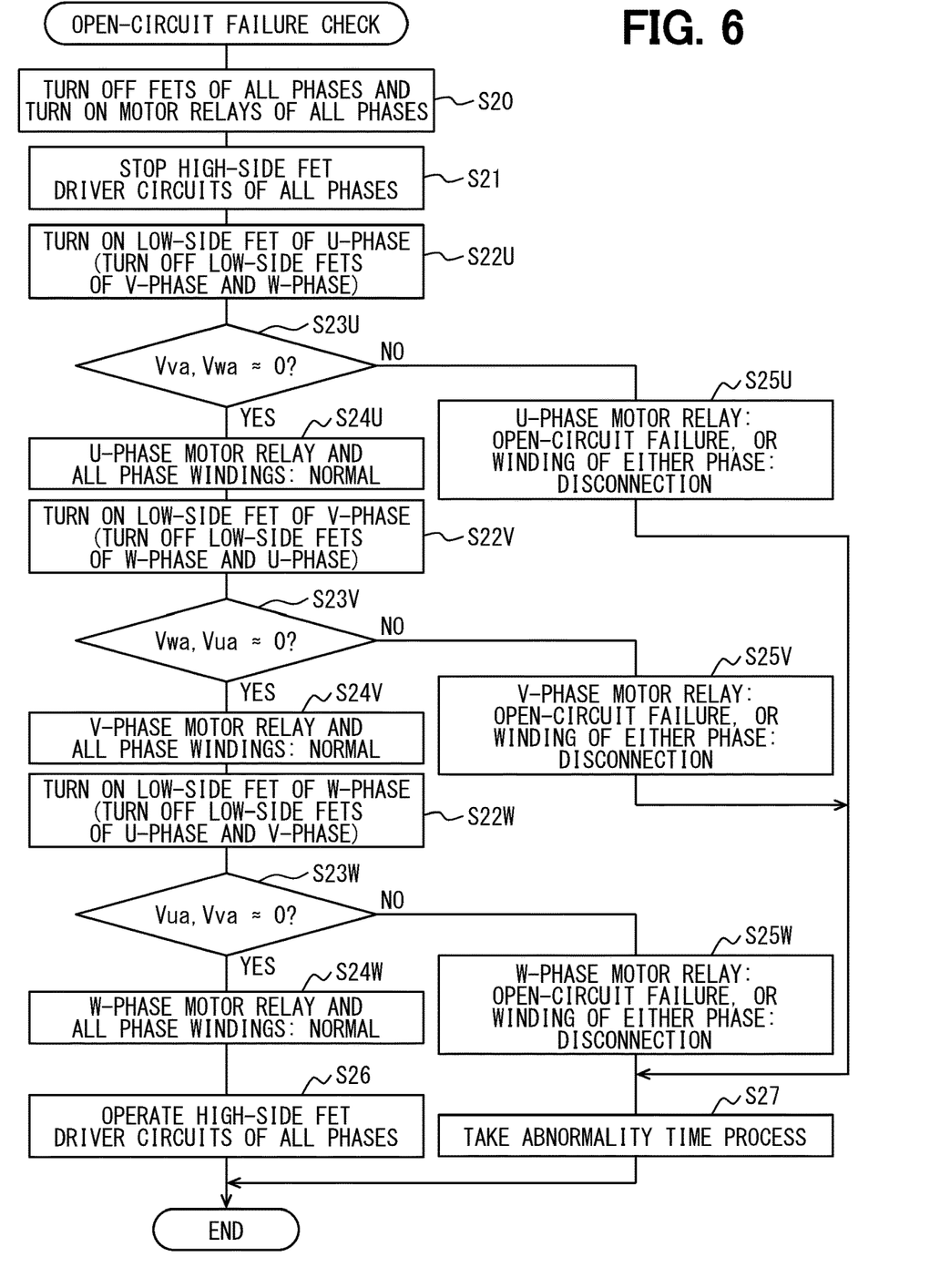
FIG. 6 is a flowchart of an open-circuit failure checking process.

As a countermeasure for this problem, in the present embodiment, the operation of the driver circuit corresponding to the high-side FET 61, 62, 63 of each phase is stopped when the checking unit 25 acquires the terminal voltage Va. That is, during the abnormality detection, for example, the driver circuit 31 corresponding to the U-phase high-side FET 61 does not operate both of the ON-driving FET 325 and the OFF-driving FET 326. As shown in FIG. 5 and FIG. 6, the low-side FET 64, 65, 66 of each phase is operated during abnormality detection, but the high-side FET 61, 62, 63 is not operated. As a result, stopping both FETs 325 and 326 does not affect adversely. A leak current flowing from the high-side FET 61 as shown by a thick dotted line arrow cannot be eliminated. However, it is possible to cut off the leak current Lc flowing to the pull-down resistor Rd and minimize the influence of the error.

Second Embodiment

Figure 4:
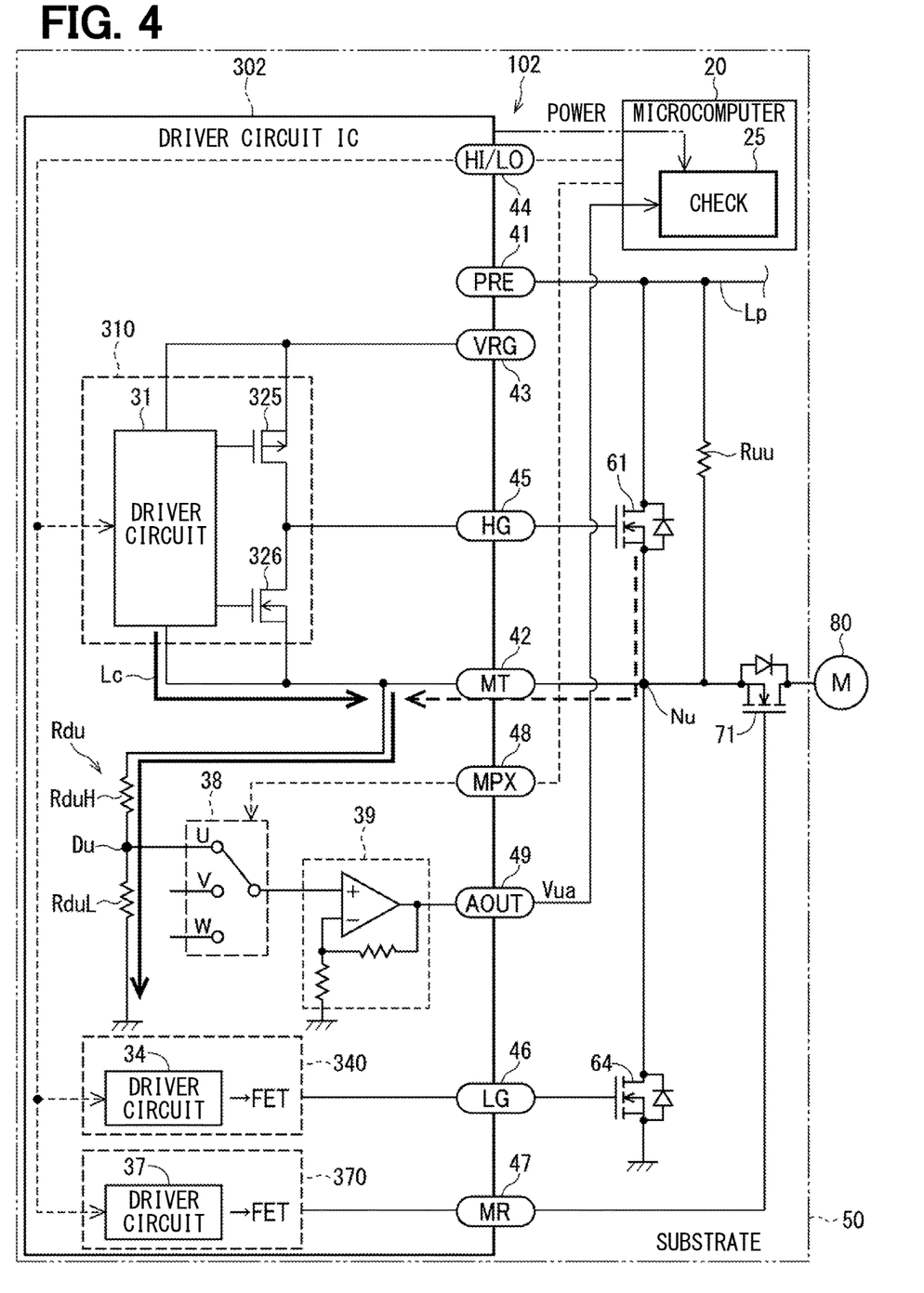
FIG. 4 is a circuit configuration diagram relating to a voltage monitor for one phase of the abnormality detection device according to the second embodiment.

The ECU 102 of the second embodiment will be described next with reference to FIG. 4. The ECU 102 of the second embodiment is different from the ECU 101 of the first embodiment in that the pull-up resistor Ruu is mounted outside the driver circuit IC 302. That is, in the ECU 102 of the second embodiment, only the pull-down resistor Rdu, the multiplexer 38 and the amplifier circuit 39 are provided inside the driver circuit IC 302 as opposed to the first embodiment shown in FIG. 3.

In the second embodiment, by avoiding heat generation of the driver circuit IC 302 caused by the current supply to the pull-up resistor Rdu and providing the two voltage dividing resistors for one phase forming the pull-down resistor Rd inside the driver circuit IC 302, an increase in the mounting area on the circuit substrate 50 can be suppressed. Further, by providing the multiplexer 38 as in the first embodiment, an increase in the mounting area of the circuit substrate 50 is further suppressed, and the microcomputer 20 can be downsized.

Furthermore, the leak current Lc flowing through the pull-down resistor Rd can be cut off by stopping the operation of the driver circuit 31 corresponding to the high-side FET 61 of each phase when performing abnormality detection, as in the first embodiment.

Modification of Second Embodiment

Contrary to the second embodiment, only the pull-up resistor Ruu may be provided inside the driver circuit IC 302, and the pull-down resistor Rdu, the multiplexer 38, and the amplifier circuit 39 may be mounted outside the driver circuit IC 302. In this modification, heat generation of the driver circuit IC 302 due to current supply to the pull-down resistor Rdu can be avoided. Further, an increase in the mounting area of the substrate 50 corresponding to the pull-up resistor Ru can be suppressed.

(Failure Checking Process)

A failure checking process executed by the checking unit 25 as a common operation of the first and second embodiment will be described with reference to flowcharts shown in FIG. 5 and FIG. 6, In the following flowcharts, a symbol S indicates a step. In this failure checking process, it is assumed that the motor relay 71, 72, 73 of each phase is turned on and off at the same time. In case where the motor relay 71, 72, 73 of each phase is individually turned on and off, the failure checking may be executed differently.

FIG. 5 shows a checking process of checking a short-circuit failure of the motor relay 71, 72, 73. In S10, the high-side and low-side FETs 61 to 66 of all phases are turned off, and the motor relays 71, 72 and 73 of all phases are also turned off. In case where the motor relay 71, 72, 73 is formed of a MOSFET or the like, a current flows from the arm connection point Nu, Nv, Nw to the neutral point 84 of the motor 80 through the free-wheeling diode even when the motor relay 71, 72, 73 is in the OFF state.

In S11, the operations of the driver circuits 31 corresponding to the high-side FETs 61, 62 and 63 of all phases are stopped prior to the abnormality detection. Thereby, as described above, the leak current from each driver circuit 31 to the pull-down resistors Rdu, Rdv, Rdw can be cut off, and errors arising when the checking unit 25 acquires the terminal voltage Vua, Vva, Vwa can be reduced.

In S12U, only the U-phase low-side FET 64 is turned on. At this time, the V-phase low-side FET 65 and the W-phase low-side FET 66 are maintained in the OFF state. It is noted that a threshold value Vth is provided for checking the short-circuit failure. In case that the U-phase motor relay 71 is normal, the voltages applied to the motor current path from the pull-up resistors Ruv and Ruw of the V-phase and the W-phase are held unchanged, so that the terminal voltages Vva and Vwa are equal to or higher than the threshold value Vth. Therefore, in S13U, it is checked whether the terminal voltages Vva and Vwa are equal to or larger than the threshold value Vth. In case of YES, it is determined in S14U that the U-phase motor relay 71 is normal.

On the other hand, in case that the U-phase motor relay 71 is short-circuited, a current flows from the U-phase low-side FET 64 to the ground through the neutral point 84 of the motor 80 and the U-phase motor relay 71 when the voltage is applied to the motor current path from the pull-up resistors Ruv and Ruw of the V-phase and W-phase. Therefore, the voltages at the inter-arm connection points Nv and Nw of the V-phase and W-phase are substantially 0, that is, Vva and Vwa are substantially 0, and hence Vva and Vwa are smaller than Vth holds. Therefore, in case of NO in S13U, it is determined in S15U that the U-phase motor relay 71 has a short-circuit failure, and S17 is executed as an abnormality time process.

Subsequently, the similar process is repeated for the V-phase. In S12V, the U-phase low-side FET 64 and the W-phase low-side FET 66 are turned off and only the V-phase low-side FET 65 is turned on. In S13V, it is checked whether the terminal voltages Vwa and Vua are equal to or larger than the threshold value Vth. If YES, it is determined in S14V that the V-phase motor relay 72 is normal. In the case of NO in S13V, it is determined in S15V that the V-phase motor relay 72 has a short-circuit failure, and the process proceeds to S17 to take the abnormality time process.

Subsequently, the similar process is repeated for the W-phase. In S12W, the low-side FET 64 of the U-phase and the low-side FET 65 of the V-phase are turned off and only the low-side FET 66 of the W-phase is turned on. In S13W, it is checked whether the terminal voltages Vua and Vva are equal to or larger than the threshold value Vth. If YES, it is determined in S14W that the motor relay 72 of the W-phase is normal. In case of NO in S13W, it is determined in S15W that the motor relay 72 of the W-phase has the short-circuit failure. S17 is executed as the abnormality time process.

After confirming in S14W that all the phases are normal, the operation of the driver circuits 31 corresponding to the high-side FETs 61, 62 and 63 of all phases are restored in S16. Next, FIG. 6 shows a checking process of an open-circuit failure of a motor relay or a disconnection failure of a motor winding. In S20, the high-side and low-side FETs 61 to 66 of all phases are turned off, and the motor relays 71, 72 and 73 of all phases are turned on.

In S21, prior to detecting the abnormality, the operations of the driver circuits corresponding to the high-side FETs 61, 62 and 63 of all phases are stopped to thereby cut off the leak current. In case the open-circuit failure checking is performed continuously after the short-circuit failure checking, it is also possible to shift from the short-circuit failure checking to the open-circuit failure checking while continuously stopping the operation of the driver circuits without restoring the operation the of the driver circuits in S16 of FIG. 5 and re-stopping of the driver circuits in S21 of FIG. 6.

In S22U, only the U-phase low-side FET 64 is turned on. At this time, the V-phase low-side FET 65 and the W-phase low-side FET 66 are maintained in the OFF state. In case that the U-phase motor relay 71 and the windings 81, 82, and 83 of all phases are normal, a current flows from the U-phase low-side FET 64 to the ground through the neutral point 84 of the motor 80 when a voltage is applied from the pull-up resistors Ruv and Ruw of the V-phase and W-phase to the motor current path. Therefore, the voltages at the inter-arm connection points Nv and Nw of the V-phase and W-phase are almost zero.

Therefore, in S23U, it is checked whether the terminal voltages Vva and Vwa are substantially 0. If YES, it is determined in S24U that the motor relay 71 of the U-phase and the windings 81, 82 and 83 of all phases are normal. In case of NO in S23U, it is determined in S25U that the U-phase motor relay 71 has the open-circuit failure indicating that the motor relay 71 remains open or the windings 81, 82, 83 of any phase has the disconnection failure, and S27 is executed to perform the abnormality time process.

Subsequently, the similar process is repeated for the V-phase. In S22V, the low-side FET 64 of the U-phase and the low-side FET of the W-phase 66 are turned off and only the low-side FET 65 of the V-phase is turned on. In S23V, it is checked whether the terminal voltages Vwa and Vua are substantially 0. In case of YES, it is determined in S24V that the V-phase motor relay 72 and the windings 81, 82 and 83 of all phases are normal. In case of NO in S23V, it is determined in S25V that the V-phase motor relay 72 has the open-circuit failure or the winding 81, 82, 83 of any phase has the disconnection failure, and S27 is executed to perform the abnormality time process.

Subsequently, the similar process is repeated for the W phase. In S22W, the low-side FET 64 of the U-phase and the low-side FET 65 of the V-phase are turned off and the low-side FET 66 of the W-phase is turned on. In S23W, it is checked whether the terminal voltages Vua and Vva are substantially 0. In case of YES, it is determined in S24W that the W-phase motor relay 73 and the windings 81, 82 and 83 of all phases are normal. In case of NO in S23W, it is determined in S25W that the W-phase motor relay 73 has the open-circuit failure or the windings 81, 82, 83 of any phase has the disconnection failure, and S27 is executed to perform the abnormality time process.

After confirming in S24W that all the motor relays 71 to 73 and all the motor windings 81 to 83 are normal, the operation of the driver circuits corresponding to the high-side FETs 61, 62, 63 of all phases are restored in S26. As described above, the checking unit 25 checks whether any one of the motor relays 71, 72 and 73 has the short-circuit failure and whether any one of the motor relays 71, 72 and 73 has the open-circuit failure, or whether any one of the motor windings 81, 82 and 83 has of the disconnection failure.

Other Embodiment (A) In the first and second embodiments, the amplifier circuit 39 may be provided for each phase, and the multiplexer 38 may be provided between the output side of the amplifier circuit 39 and the monitor terminal 49. Further, the multiplexer 38 and the monitor terminal 49 may be provided for each phase without the multiplexer 38.

(B) In case the voltage at the voltage dividing point Du, Dv, Dw of the voltage dividing resistors RdH and RdL forming the pull-down resistor Rd has a voltage level that can ensure detection accuracy, the amplifier circuit 39 may not be provided. Further, the pull-down resistor Rd may be formed of only the voltage dividing resistor RdL of the ground side, and the voltage at the inter-arm connection point Nu, Nv, Nw may be directly input to the amplifier circuit 39.

(C) The mounting configuration of the pull-up resistor Ru and the pull-down resistor Rd may be changed for each phase or system. For example, the U-phase pull-up resistor Ruu and the pull-down resistor Rdu may be provided inside the driver circuit IC 301, and the V-phase and W-phase pull-up resistors Ruv, Ruw and the pull-down resistors Rdv, Rdw may be mounted outside the driver circuit IC 301. Alternatively, the pull-up resistor Ru and the pull-down resistor Rd that are only one of the two systems may be provided within the driver circuit IC 301. The pull-up resistor Ru or the pull-down resistor Rd of at least one phase of one system may be provided inside the driver circuit IC 301.

(D) The abnormality detection device of the present disclosure may be provided not only in the one or two three-phase systems described in the above embodiments but also in a system of four or more phases or three or more systems. As the number of phases and systems increase, an increase in the mounting area on the circuit substrate is suppressed by providing the pull-up resistors or the pull-down resistors within the driver circuit IC.

(E) As a failure checking process, only one of the failure of the motor relay short-circuit and the failure of the open-circuit of the motor relay or the disconnection of the winding may be executed. Further, the checking unit 25 may be configured as a discrete logic circuit on the circuit substrate 50 in place of the microcomputer 25.

(F) The multi-phase AC motor to be controlled according to the present disclosure is not limited to the steering assist motor 80 of the electric power steering apparatus 90, but may be a motor for other applications. In particular, the present disclosure is effective in a system in which the mounting space is restricted and the circuit substrate size is severely restricted.

In addition to the redundancy of only the driver unit, the microcomputer having the check function may have a redundant configuration.

The present disclosure should not be limited to the embodiments described above, and various other embodiments may be implemented without departing from the scope of the present disclosure.

What is claimed is:

1. An abnormality detection device comprising:
an inverter configured in a bridge form of multiple phases between a power supply line and a ground line connected to a DC power supply and having a high-side switching element and a low-side switching element as bridge arms connected in series in each phase to convert a power of the DC power supply and supply a converted power to each phase winding of an AC motor of multiple phases;
multiple motor relays, each provided in a motor current path between an inter-arm connection point between the high-side switching element and the low-side switching element of each phase and the phase winding of each phase to conduct and cut off the motor current path;
pull-up resistors, each connecting the power supply line and the inter-arm connection point of each phase;
pull-down resistors, each connecting the inter-arm connection point of each phase and the ground line;
a checking unit configured to acquire a voltage corresponding to a voltage of the inter-arm connection point of each phase as a terminal voltage and check a short-circuit failure or an open-circuit failure of the motor relay or a disconnection failure of the phase winding of each phase based on the terminal voltage;
driver circuits packaged within a driver circuit IC and provided to output gate signals to the high-side switching element and the low-side switching element of the inverter, respectively; and
a multiplexer provided between the pull-down resistors and a monitor terminal of the driver circuit IC, the multiplexer configured to select the voltage corresponding to the voltage of any one of inter-arm connection points of multiple phases and outputs a selected voltage to the monitor terminal,
wherein
at least a part of the pull-up resistors or the pull-down resistors is mounted within the driver circuit IC including the driver circuits, and
all the pull-down resistors of multiple phases are mounted within the driver circuit IC.

2. The abnormality detection device according to claim 1, wherein:
the driver circuit IC is configured to have a function of supplying power to the checking unit to thereby operate the checking unit.

3. The abnormality detection device according to claim 1, wherein:
the AC motor is provided as a steering assist motor of a vehicle; and
the inverter and the multiple motor relays are operated to supply the converted power to the steering assist motor in accordance with a steering torque applied to a steering wheel of the vehicle, when the checking unit determines that no failure is present in a power supply circuit including the motor relay to the steering assist motor.

4. The abnormality detection device according to claim 1, wherein:
all the pull-up resistors and the pull-down resistors of multiple phases are mounted within the driver circuit IC; and
each pull-down resistor is formed of multiple resistors.

5. An abnormality detection device comprising:
an inverter configured in a bridge form of multiple phases between a power supply line and a ground line connected to a DC power supply and having a high-side switching element and a low-side switching element as bridge arms connected in series in each phase to convert a power of the DC power supply and supply a converted power to each phase winding of an AC motor of multiple phases;
multiple motor relays each provided in a motor current path between an inter-arm connection point between the high-side switching element and the low-side switching element of each phase and the phase winding of each phase to conduct and cut off the motor current path;
pull-up resistors, each connecting the power supply line and the inter-arm connection point of each phase;
pull-down resistors, each connecting the inter-arm connection point of each phase and the ground line;
a checking unit configured to acquire a voltage corresponding to a voltage of the inter-arm connection point of each phase as a terminal voltage and check a short-circuit failure or an open-circuit failure of the motor relay or a disconnection failure of the phase winding of each phase based on the terminal voltage; and driver circuits packaged within a driver circuit IC and provided to output gate signals to the high-side switching element and the low-side switching element of the inverter, respectively,
wherein
at least a part of the pull-up resistors or the pull-down resistors is mounted within the driver circuit IC including the driver circuits,
all the pull-down resistors of multiple phases are mounted within the driver circuit IC, and
the driver circuit corresponding to the high-side switching element and the low-side switching element of each phase is stopped operating when the checking unit acquires the terminal voltage.

\* \* \* \* \*